United States Patent [19]

Nilsson

[11] Patent Number: 4,832,550
[45] Date of Patent: May 23, 1989

[54] SCREW AND NUT DEVICE EQUIPPED WITH A ROTATION BRAKE

[75] Inventor: Sven W. Nilsson, Partille, Sweden

[73] Assignee: SKF Nova AB, Goteborg, Sweden

[21] Appl. No.: 87,082

[22] Filed: Aug. 19, 1987

[30] Foreign Application Priority Data

Sep. 10, 1986 [SE] Sweden .............................. 8603784

[51] Int. Cl.⁴ ............................................. F16B 37/12
[52] U.S. Cl. ................................... 411/262; 411/324; 411/438; 411/252
[58] Field of Search ............... 411/251, 252, 247, 248, 411/262, 311, 324, 432, 433, 438; 74/424.8 R, 424.8 NA

[56] References Cited

U.S. PATENT DOCUMENTS

| | | | |
|---|---|---|---|
| 1,258,777 | 3/1918 | Johannessen et al. | 411/324 |
| 1,830,919 | 11/1931 | Sundh | 411/262 |
| 2,387,257 | 10/1945 | Haas | 411/438 |
| 4,298,297 | 11/1981 | Courson | 411/262 |

FOREIGN PATENT DOCUMENTS

. 55095  6/1982  European Pat. Off. ............ 411/438

Primary Examiner—Neill R. Wilson
Attorney, Agent, or Firm—Eugene E. Renz, Jr.

[57] ABSTRACT

In a device for bringing about rotational braking in a screw and nut device incorporating a nut, which is rotatable and displaceable relative to a threaded bar, and a helical spring enclosing the bar, which spring at braking is clamped against the bar, for effecting a big braking moment and a small wear in the thread of the bar, there is arranged a helical element with a loose fit in the thread groove of the bar, which element extends radially outside the thread flank tip. The helical spring is futhermore arranged with radial pretension of the thread flank tip between the winding turns of the helical element.

4 Claims, 1 Drawing Sheet

SCREW AND NUT DEVICE EQUIPPED WITH A ROTATION BRAKE

FIELD OF THE INVENTION

The present invention relates to so-called ball-nut mechanisms, and more specifically, to a novel braking arrangement for such mechanisms.

BACKGROUND OF THE INVENTION

Screw and nut devices with low internal friction, e.g. so-called ball nut mechanisms, wherein a row of balls are arranged in the thread grooves between nut and screw, have the property of not being irreversible, which in certain cases may be an inconvenience, e.g. in a lifting device, where the load is lifted by such a screw and nut device, this property may cause the load to lower itself when no external driving torque acts upon the device. This may be a safety risk and different braking members, which prevent unintentional movement are earlier known. A helical spring may e.g. enclose the screw and be clamped against it for braking purpose, when the device is loaded in a direction opposite to the driving direction and no driving torque is applied (SE-A-8505997-0). In this known device, the braking spring is located in the thread groove of the screw and it exerts a friction force in these during braking. This implies certain drawbacks. Then wear will occur in the thread, which will reduce the service life of the screw. The friction force, furthermore, will occur at the smallest distance from the rotation axis, when the contact takes place in the bottom of the thread, which gives the smallest possible braking moment for a given frictional force.

SUMMARY OF THE INVENTION

The purpose of the present invention is to provide a device of the type defined in the preamble, in which the biggest possible braking moment is obtained when exerting the smallest possible wear in the thread groove. To this end, in accordance with the present invention, the mechanism comprises a nut rotatably mounted and displaceable axially on a threaded bar and a helical spring circumscribing the bar which when the mechanism is axially loaded and is not subject to an external driving torque, is clamped against the bar and breaks the relative rotation between the nut and the bar, and including a helical element arranged with a loose fit in the threaded groove of the bar which extends radially outside the thread flank tip, the helical spring being arranged with radial pretension on the thread flank tip between the winding turns of the helical element.

Such a device can be manufactured in a simple manner from non-expensive parts and by simple operations, and the device is economic and reliable. Any lubricant layers in the thread groove are not destroyed by the braking device, which can slide against a surface upon the screw where the friction is big and is not reduced by presence of lubricant.

These and other objects of the present invention and various features and details of the operation and construction thereof are hereinafter more fully set forth with reference to the accompanying drawings, wherein:

FIG. 1 and FIG. 2 show a longitudinal section and a cross section through a part of a device according to an embodiment of the invention.

DESCRIPTION OF THE PREFERRED EMBODIMENT

Figure 1:
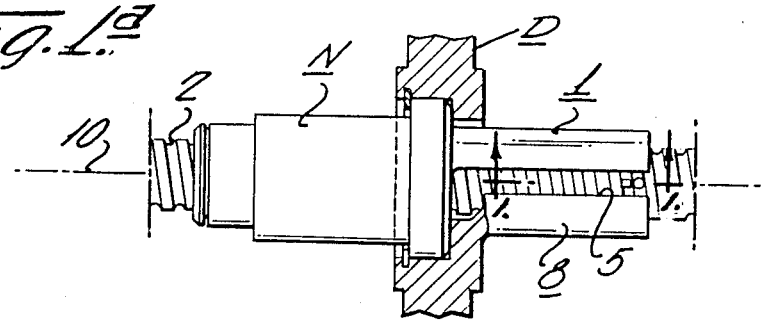
Figure 1:
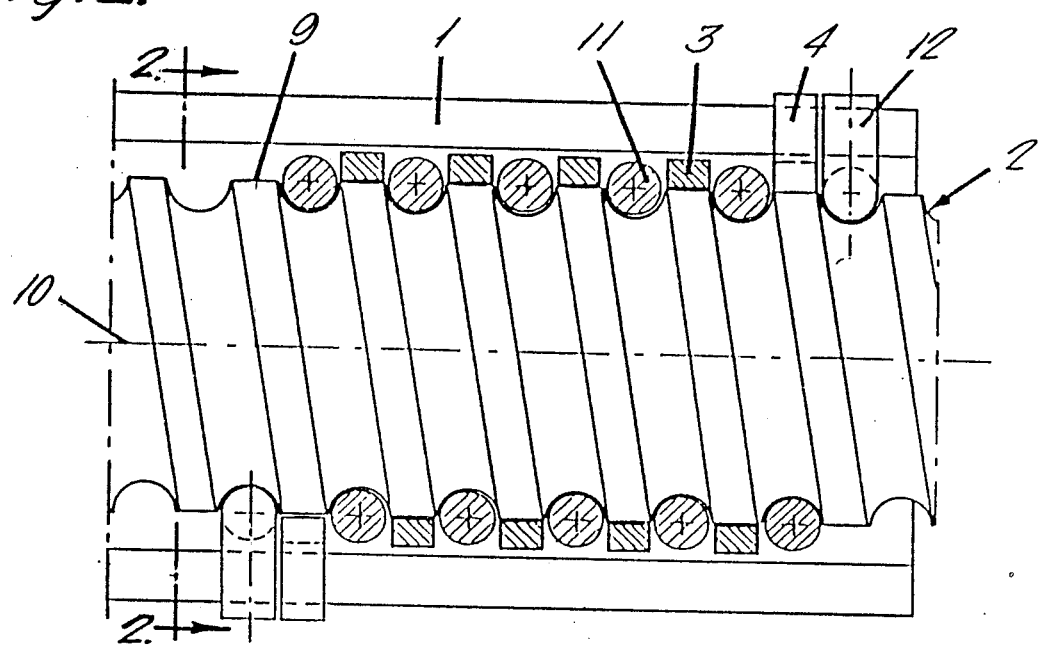
Figure 2:
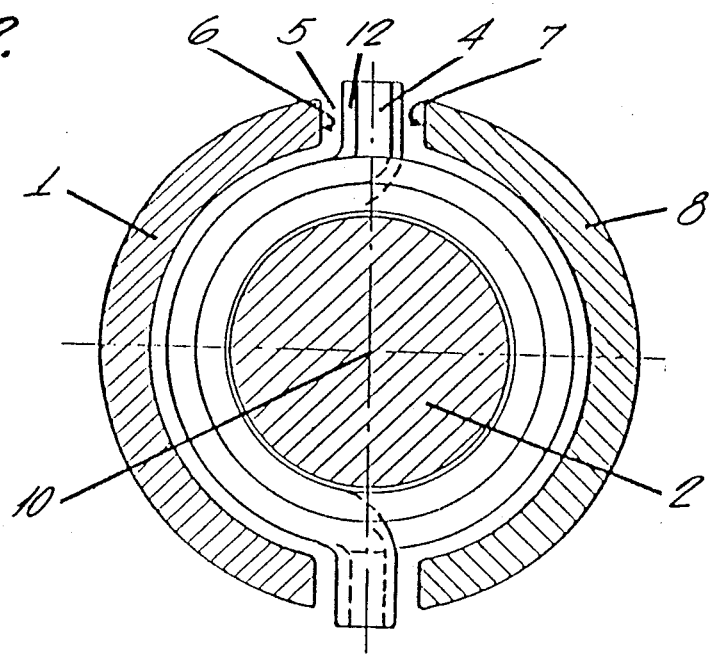

FIG. 1a is a fragmentary elevational view of a screw and nut assembly according to the present invention.

The device incorporates an element 1, which is preferably designed as a part of a cylinder and which is connected to or forms part of a nut N, as illustrated in FIG. 1a, which, in a manner known per se, is rotatable and displaceable on a threaded bar 2. The bar is enclosed by a helical spring 3 having an end portion 4 extending radially outwards from the bar 2 and projects into a space 5 between a surface 6 on the element 1 connected to the nut and another surface 7 on an element 8, which connects to a driving device D by means of which the nut N can be rotated thus that it moves along the bar 2.

The driving device D rotates during operation the element 8 thus that the surface 7 is pressed against the end portion 4 of the helical spring, and this is then pressed against the surface 6 thus that the element 1 and the nut N are brought to rotate and move along the bar 2. The helical spring 3 thereby rotates freely about the bar 2, as the forces acting upon the helical spring tend to increase the circumference of the spring and thereby to produce a play between the spring and the bar.

If the driving device D does not exert any torque, and element 1 instead tends to rotate due to the nut N being axially loaded and is, therefore, exerted to a torque via the thread contact, then surface 6 is pressed against the end portion 4 of the helical spring, whereby the forces upon the helical spring become such that the spring tends to reduce its circumference and to press harder against the bar 2, thus that the spring is braked by friction on the bar and prevents relative rotation between the bar and the nut N. The device thus is irreversible.

A double-acting function, i.e. the same function as described above but acting in both directions, is obtained if also the other end of the spring is provided with a portion projecting into a space, which is located diametrically to the first end portion between surfaces connected to elements 1 and 8, which are then preferably made as two half cylinders, such as shown in the drawing.

According to the invention the helical spring 3 is arranged on the flank tip 9 of the thread of the bar 2. This means that the very thread groove is left unengaged by the spring, whereby wear cuased by friction is avoided. The flank tip furthermore can be made thus that it gives a desired friction coefficient together with the spring without dependency of the fact that the thread groove must have such a surface that it is appropriate as a race track for rolling bodies or as a sliding surface against a nut thread. A further advantage of the helical spring being arranged on the flank tip is that this arrangement gives the biggest possible distance between the rotational axis 10 and the friction surface, which again gives the biggest possible braking torque when the rotation is braked. The helical spring is arranged with a radial pretension on the thread flank tip in order to ascertain that an initial braking force always shall act in the contact spring-flank tip. Thereby it is ascertained that the force from the surface 6 acting upon the end portion 4 of the spring, when the nut N tends to rotate due to the fact that it carries an external axial load, will become so big that the spring is contracted and is clamped against the bar 2. When the device is driven by a torque from the driving device via the element 8 and the surface 7, then the spring strives to expand, whereby the pretension is reduced thus that the braking force can be neglected in comparison with other occurring forces.

In order to prevent the helical spring from being displaced thus that it is located in the thread groove on the bar 2 a helical element 11 according to the invention is arranged with a loose fit in the thread groove of the bar and extends radially outside the thread flank tip 9. The helical spring 3 thereby extends between the winding turns of the helical element 11, i.e. the spring 3 and the element 11 are concentric and can be considered as screwed into each other. The element 11 can be prevented from being screwed out of its position by at least one of its ends being provided with a radially projecting portion 12, which projects into the above-mentioned space 5 like the portion 4 of the spring 3. Due to the fact that the element 11 has a loose fit in the thread groove it will never become clamped against this, but it only acts as a positioning member for the spring 3 and a spacer for its winding turns. The element 11 is preferably a helical spring shaped as a wire having a section corresponding to the shape of the thread groove in the bar 2. In a ball nut mechanism this form is circular, whereby the wire can have a circular section. The thread flank tip 9 is preferably cylindric, whereby the helical spring 3 has an internal surface with the corresponding cylindric shape. Such a shape is simple to produce and to machine. The bar may e.g. be ground in a centerless grinding machine and the helical spring may be made from a wire having a rectangular section.

Other embodiments of the invention than the one described are possible within the scope of the claims. The shape of the thread groove and of the thread flank tip can be varied as well as the section of the spring 3 and of the element 11. Screw and nut can cooperate by means of rolling bodies or by direct thread flank contact.

What is claimed is:

1. In a screw and nut (N) mechanism including a nut rotatable and displaceable relative to a threaded member (2), a brake means for braking relative rotation of the nut (N) and threaded member (2) comprising a helical spring (3) circumferentially surrounding the threaded member (2), which spring (3) is clamped against the threaded member (2) and brakes the relative rotation between the nut (N) and te threaded member (2), characterized thereby that a helical element (11) is arranged with a loose fit in the thread groove of the threaded member (2) and extends radially outside the thread flank tip (9), said element (11) preventing the spring (3) from being displaced into the thread groove, and that the helical spring (3) is arranged with radial pretension on the thread flank tip (9) between the winding turns of the helical element (11).

2. A device as claimed in claim 1, characterized thereby, that the helical element (11) is second helical spring, which is concentric to and screwed into the first-mentioned helical spring (3).

3. A device as claimed in claim 1, characterized thereby, that the thread flank tip (9) is cylindric and that the inner surface of the first-mentioned helical spring (3) has a correspondingly cylindric shape.

4. A device as claimed in claim 3, characterized thereby, that the helical spring (3) is produced from a wire having a rectangular section.

* * * * *